US006466209B1

(12) United States Patent
Bantum

(10) Patent No.: US 6,466,209 B1
(45) Date of Patent: Oct. 15, 2002

(54) METHOD FOR TRANSPARENT MARKING OF DIGITAL IMAGES FOR STORAGE, RETRIEVAL AND PROCESSING WITHIN A COMPUTER DATABASE

(75) Inventor: Michael G. Bantum, San Diego, CA (US)

(73) Assignee: NCR Corporation, Dayton, OH (US)

( * ) Notice: Subject to any disclaimer, the term of this patent is extended or adjusted under 35 U.S.C. 154(b) by 1096 days.

(21) Appl. No.: 08/568,905

(22) Filed: Dec. 7, 1995

(51) Int. Cl.[7] .................................................. G06F 17/21
(52) U.S. Cl. ......................................................... 345/432
(58) Field of Search ................................. 395/132, 131, 395/135; 399/366; 380/54, 25; 345/432

(56) References Cited

U.S. PATENT DOCUMENTS

| | | | |
|---|---|---|---|
| 4,972,476 A | * 11/1990 | Nathans | 380/23 |
| 5,113,437 A | * 5/1992 | Best et al. | 380/3 |
| 5,488,664 A | * 1/1996 | Shamir et al. | 380/54 |
| 5,521,722 A | * 5/1996 | Colvill et al. | 358/500 |
| 5,530,759 A | * 6/1996 | Braudaway et al. | 380/54 |
| 5,537,223 A | * 7/1996 | Curry | 358/460 |
| 5,568,570 A | * 10/1996 | Rabbani | 382/238 |
| 5,613,004 A | * 3/1997 | Cooperman et al. | 380/28 |
| 5,636,292 A | * 6/1997 | Rhoads | 382/232 |
| 5,659,726 A | * 8/1997 | Sandford, II et al. | 707/101 |
| 5,687,236 A | * 11/1997 | Moskowitz et al. | 380/28 |
| 5,721,788 A | * 2/1998 | Powell et al. | 382/100 |

FOREIGN PATENT DOCUMENTS

EP 0 581 317 * 2/1994 ............ G07D/7/00

OTHER PUBLICATIONS

Cox et al, "Secure Spread Spectrum Watermarking for Multimedia," NEC Technical Report 95–10, Jan. 1995.*
Braudaway et al, "Protecting Publicly–Available Images with a Visible Image Watermark", IBM Research Report RC 20336 (89918), Computer Science/Mathematics, Jan. 15, 1996.*

(List continued on next page.)

Primary Examiner—Stephen S. Hong
(74) Attorney, Agent, or Firm—James M. Stover

(57) ABSTRACT

A method for including additional data, such as identifying text, within a stored digital image, the additional data being hidden from view when the image is displayed. The method includes the step of identifying a region within the digital image which contains picture elements, or pixels, having either a constant intensity, hue or saturation value, or a random distribution of such values for the storage of "hidden" data. An pixel value is determined which differs slightly or blends well with the values contained within the image region into which the hidden data is to be written; and the additional data is saved within the constant or random content image region at this determined intensity value. The intensity value utilized for the encoding of the hidden data or text, although differing slightly from the intensity values of the background pixels within the image region into which the hidden data or text is written, is selected such that the difference between the pixel value of the background and the pixel value of the hidden data is indiscernible when the image is viewed by the human eye. The hidden data stored with the digital image may be identifying text which can be used to aid in the storage, recognition, classification, recovery and retrieval of digital images within a multimedia database.

16 Claims, 3 Drawing Sheets

OTHER PUBLICATIONS

Tanaka, et al, "Embedding secret information into a dithered multi–level image," Proc. 1990 IEEE Military Communications Conference, pp. 216–220, Jan. 1990.*

Matsui and Tanaka, "Video stenography," Proceedings IMA Intellectual Property Project, vol. 1, pp. 187–206, Jan. 1994.*

Macq and Quisquater, "Cryptology for Digital TV Broadcasting," Proc. of the IEEE, 83(6):944–957, Jun. 1995.*

Choudhury et al, "Copyright protection for electronic publishing over computer networks," submitted to IEEE Network Magazine, Jun. 1994.*

Brassil et al, "Electronic marking and identification techniques to discourage copying," Proceedings of Infocom 94, pp. 1278–1287, Jan. 1994.*

Boneh and Shaw, "Collusion–secure fingerprinting for digital data," Advances in Cryptology, Proceedings of Crypto 95, Springer–Verlag (distributed on an exclusive basis at the Aug. 1995 Crypto meeting), pp. 452–465.*

Caronni, "Assuring ownership rights for digital images," Proceedings of Reliable IT Systems VIS 95, Vieweg Publishing Company, Germany, Jan. 1995.*

Bender, et al, "Techniques for Data Hiding," SPIE, vol. 2420, pp. 164–173, Feb. 1995.*

Tirkel et al., "A Two–Dimensional Digital Watermark", Conference Proceedings DICTA–95. Digital Image Computing: Techniques and Applications, p. 378–383, Dec. 6, 1995.*

Tirkel et al., "Electronic Water mark", Conference Proceedings DICTA–93. Digital Image Computing: Techniques and Applications, p. 666–673 vol. 2, Dec. 8, 1993.* van Schyndel, Proceedings of Second Asian Conference on Computer Vision. ACCV '95, p. 504–508 vol. 2, Dec. 5, 1995.*

Komatsu et al., "Authentication System Using Concealed Image in Telematics", Memoirs of the School of Science & Engineering, Waseda Univ., No. 52, pp. 45–60, Oct. 1988.*

Horak, Communications and Multimedia Security. Proceedings of the IFIP TC6, TC11 and Austrian Computer Society Joint Working Conference on Communications and Multimedia Security, pp. 205–213, Sep. 1995.*

Sandford et al., "The Data Embedding Method", Integration Issues in Large Commercial Media Delivery Systems, SPIE vol. 2615, pp. 226–259, Oct. 1995.*

"WorkPackage 8: Watermarking", ACCOPI—Access Control and COpyright Protection for Images, 46 pages, Jun. 30, 1995.*

Schyndel et al., "A Digital Watermark," Image Processing, 1994 International Conference, vol. 2, Nov. 1994, pp. 86–90.*

Boland, et al., "Watermarking Digital Images for Copyright Protection," Image Processing and Its Applications, IEE Conf. Pub. 410, Jul. 1995, pp. 326–330.*

Zhao et al., "Embedding Robust Labels into Images for Copyright Protection", Proc. of 1995 Intl. Conf. on IP Rights for Specialized Information, Knowledge, & New Technology, Aug. 21, 1995, pp. 242–251.*

* cited by examiner

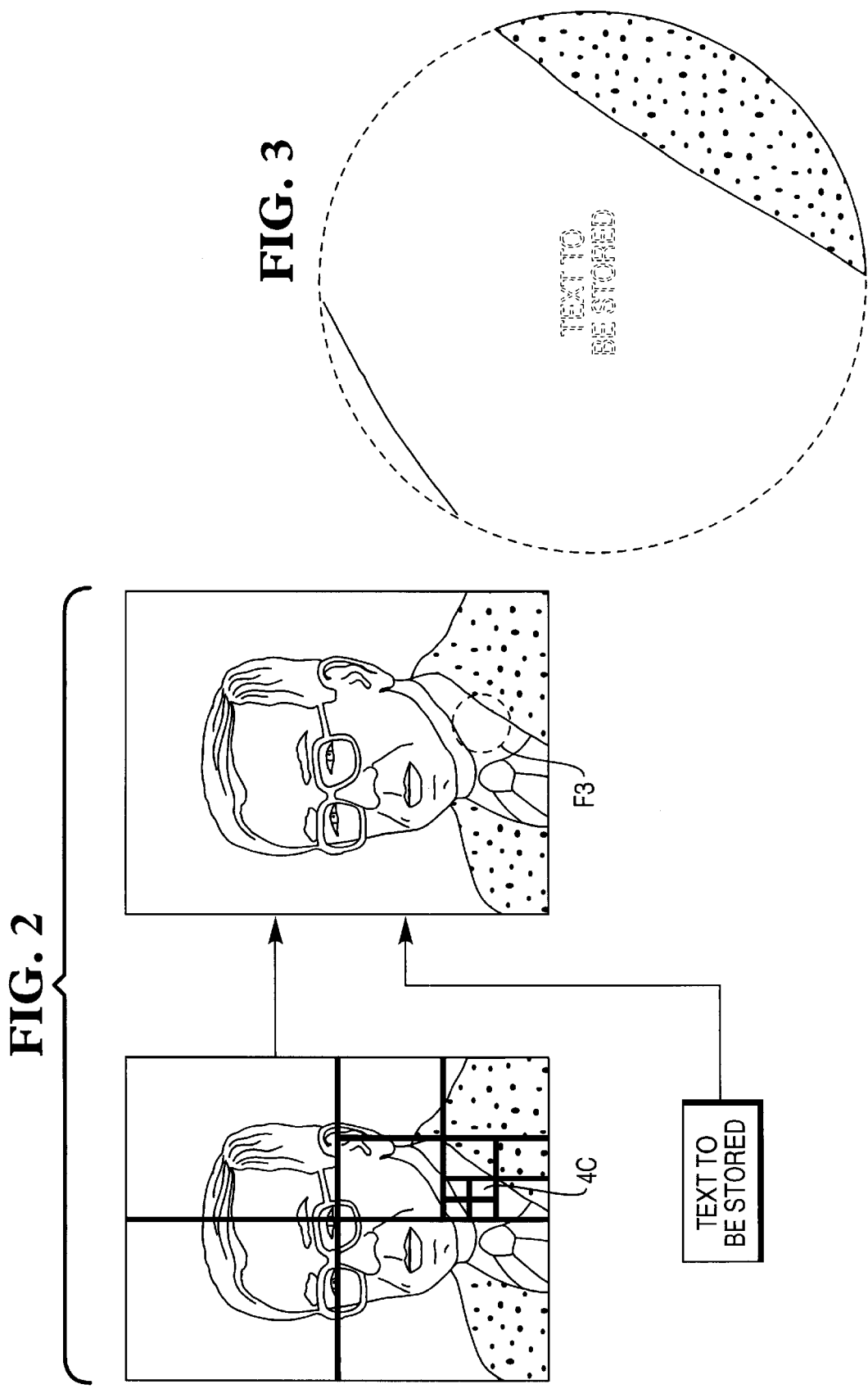

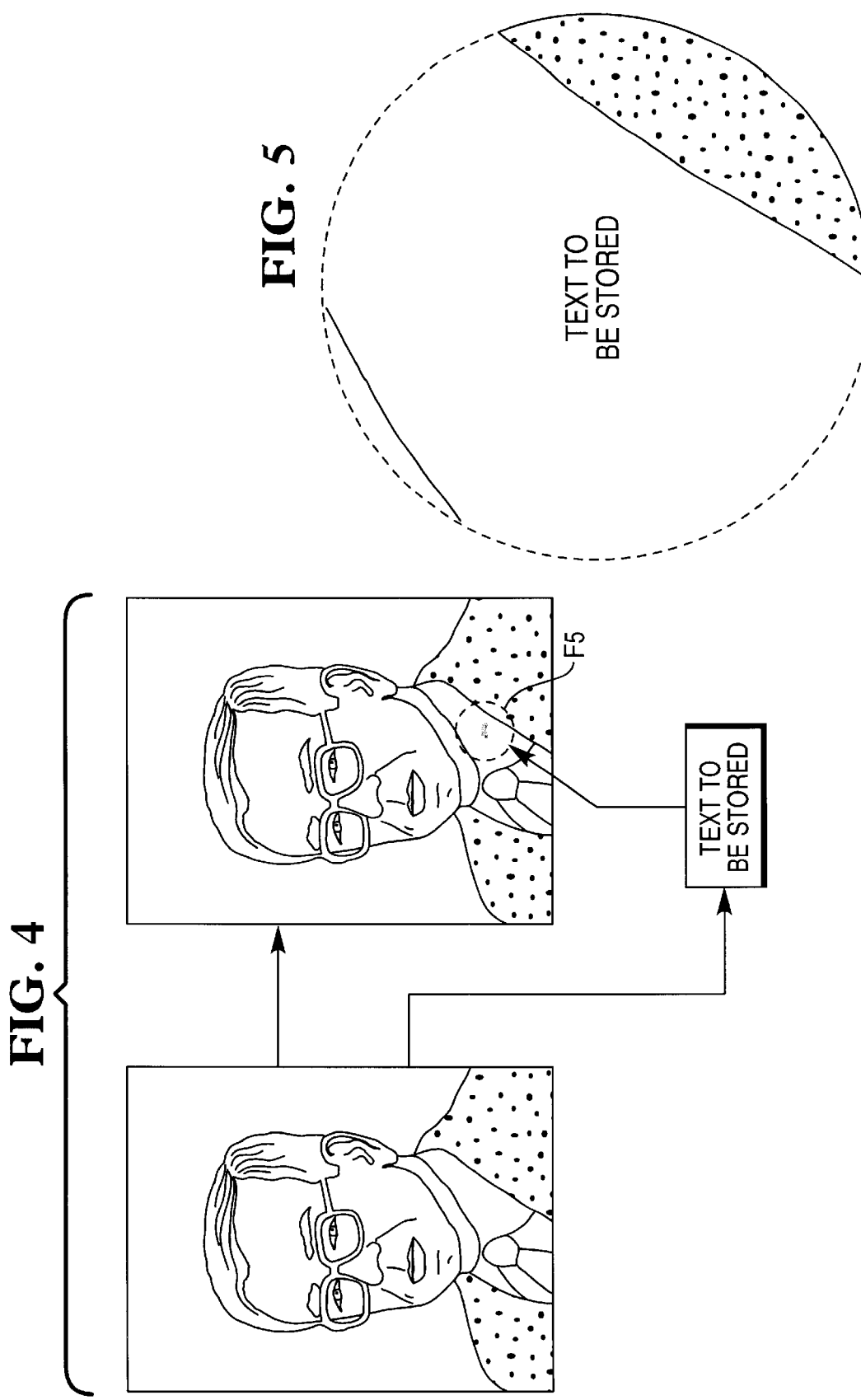

METHOD FOR TRANSPARENT MARKING OF DIGITAL IMAGES FOR STORAGE, RETRIEVAL AND PROCESSING WITHIN A COMPUTER DATABASE

The present invention relates to digital image processing and more particularly, to a method for simplifying storage, recovery, recognition, classification and retrieval of digital image information stored within a multimedia database.

BACKGROUND OF THE INVENTION

Recent increases in computer processor speed and performance, increases in the capacity and performance of volatile and non-volatile storage devices, and improvements in the overall performance and affordability of computer systems and network solutions now give many users the ability to process and store non-traditional, non-alphanumeric, data types such as multimedia objects, pictures and images, complex documents, video and audio data.

Many businesses are beginning to incorporate image and other non-traditional data objects into their mission critical data, and database technology is evolving to accommodate these complex data types. These complex data types may include bank checks and documents, business correspondence, employment records including employee pictures, medical information which may include diagnostic images such as X-rays, pictures and blueprints of buildings and facilities, video presentations, and other graphics or pictures related to a company's business.

Unique challenges are presented in the processing, classification, storage, recovery and retrieval of these non-traditional data objects. Currently images can be transmitted on networks and saved into computer databases, but there is no image content based way to recognize, recover, index or sort through images. There exists a need to develop and improve methods for recognizing, recovering and sorting image data and linking images with other types of data, including text, sound and video.

OBJECTS OF THE INVENTION

It is therefore an object of the present invention to provide a new and useful method for simplifying storage, recovery, recognition, classification and retrieval of image data within a multimedia database.

It is yet another object of the present invention to provide such a method in which identifying data or information, is included in the image content of stored digital images to aid in the storage, recovery, recognition, classification and retrieval of image data within a multimedia database.

It is still a further object of the present invention to provide a such a method in which the included text is "hidden" from view when the image is displayed.

SUMMARY OF THE INVENTION

There is provided, in accordance with the present invention, a method for including additional data, such as identifying text, within a stored digital image comprising an accessible array of pixels, each pixel having an intensity, hue or saturation value associated therewith. In one embodiment of the invention, the method includes the step of identifying a region within the digital image which contains pixels having a fixed pixel value or limited range of values. The method further comprises the steps of determining a second value slightly different from the constant value or range of values, wherein the difference between the first value, or range of values, and the second value is unnoticeable when viewed casually by the human eye; and encoding the additional data within the constant content image region, the additional data being stored at the second pixel value.

In another embodiment of the invention, the method includes the steps of identifying a region within the digital image which contains pixels having a testably random-like distribution of pixel values; determining a coded second value or values slightly different or blending into the original content region, wherein the difference between the coded intensity values and the random values occurring within the random content image region is unnoticeable when viewed by the human eye; and encoding the additional data within the random content image region, the additional data being stored at said coded pixel values.

The additional data stored with the digital image may be identifying text or symbol images, binary coded, or coded in any number based system which can be used to aid in the storage, recovery, recognition, classification and retrieval of digital images within a multimedia database.

The above and other objects, features, and advantages of the present invention will become apparent from the following description and the attached drawings.

BRIEF DESCRIPTION OF THE DRAWINGS

FIG. 2 illustrates the process for writing "hidden" text into a region of constant or random image content within a digital image.

FIG. 3 is an enlarged view of a portion of FIG. 2 containing hidden text.

FIG. 4 illustrates the process of recovering data which is invisibly masked into an image in accordance with the present invention.

FIG. 5 is an enlarged view of a portion of FIG. 4 containing hidden text which has been recovered.

DETAILED DESCRIPTION OF THE PREFERRED EMBODIMENT

Figure 1:
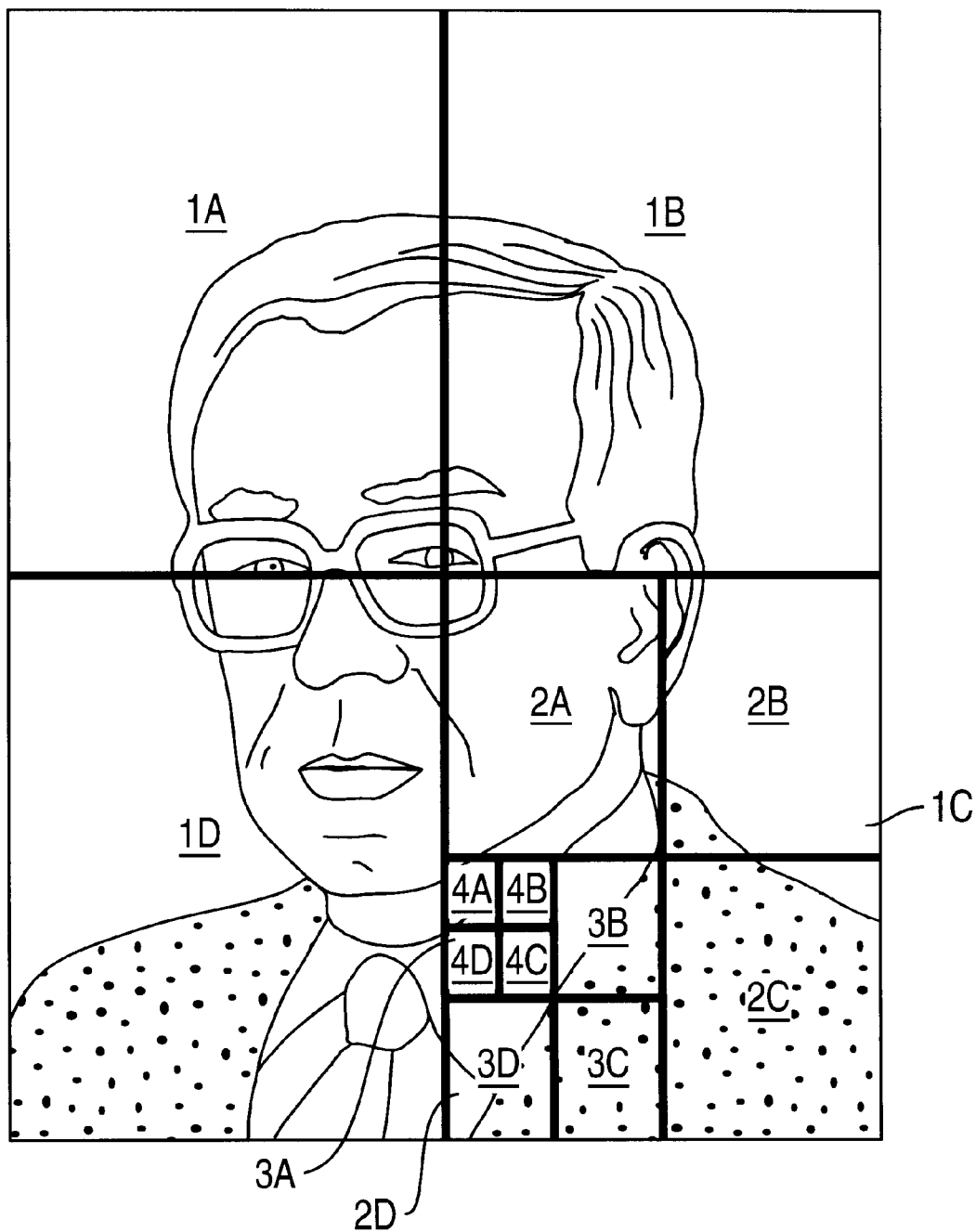
FIG. 1 illustrates a region splitting process in which an image may be subdivided into smaller and smaller quadrants in order to identify regions of constant or random-like image content.

The techniques of the present invention permit transparent, or hidden, marking of digital images. The process finds and marks text or other information into "safe" regions within an image. Safe regions for the storage of hidden text are identified through a determination of constant and/or random-like pixel value content, i.e., regions of insignificant information content. The description which follows is organized into sections which discuss the methods for (1) identifying random content image regions; (2) identifying constant content image regions; (3) marking hidden text into identified random or constant content image regions, a process referred to herein as invisible inking; and (4) recovering hidden text from a marked image. A brief discussion on possible applications for the inventive process described below is also presented.

Region finding and image thresholding techniques are well known in the art and are used as preprocessing steps in the processes discussed below.

Region Sampling: Preliminary Definitions

A digital image is an image which has been resolved into an accessible array of picture elements, referred to as pixels, and their associated properties, i.e., pixel intensity, color hue, and saturation, the pixels being arranged in rows and columns within the array, and thus accessible via their x, y coordinates in a 2-Dimensional color image (note that the methods presented below can be generalized to 3-Dimensional color images, and indeed to N-Dimensional stored "image" objects in analogous ways. Gray scale or "black and white" 2-images will be used to illustrate these methods.

For black and white images, each pixel within the image has associated therewith a brightness or intensity value which identifies the gray level at that location within the image. A typical digital image may include pixels having gray level intensity values ranging from 0, representing black, to 255, representing white.

With the exception of pixels located at the edge of the image array, each pixel p within the image array has four horizontal and vertical neighboring pixels as well as four diagonal neighbors. The eight pixels adjacent to pixel p are known as the eight-neighbors of p. Two pixels are said to be eight-connected if they are eight-neighbors and their intensity values satisfy a specified criterion of similarity, e.g., the intensity values for the neighboring pixels are equal. The pixel and its neighbors form a nine-pixel square subregion arrayed as a 3×3 pixel matrix. This concept can be generalized to k×k pixel subregions. The minimal subregion size is 2×2 pixels. Subregions over a candidate region of an image can be sampled and categorized for purposes of constantness or randomness tests. The success of these tests determine if a region is suitable for coded information.

There are many methods in the art for measuring region randomness and one obvious way to measure region constantness. Some fast methods will be used to determine regions suitable for data hiding. Note that any combination of these and others in the art may be used to determine "randomness." The final number resulting from randomness (or constantness) determinations will be called the Coefficient of Randomness (Constantness).

If a region tests "random" or "constant" the process terminates successfully, i.e., that region is selected for data hiding. Otherwise the next candidate region is checked. If no random or constant region is found among the candidates, the process fails. The minimum intensity value in the region is also returned. Note that all candidate regions could be checked for the region that is "most" random or constant according to the above described process, although this would increase process complexity accordingly.

The above-described process permits automatic identification of connected image regions characterized by "randomness" or "constantness". The key innovation for the region finding process is the use of pixel subregion sampling as the basis for a randomness or a constantness measure.

For the discussion which follows, the term pixel proportion is defined as a k vector where the first component is the pixel intensity count for intensity level i, the second component is the count for level i+1, and so forth, in an eight-connected sample window of some image region, where i is the lowest intensity in the sample. Thus the pixel proportion for the 4 vector (A, B, C, D) represents a count of A pixels of i level intensity, B pixels of i+1 level intensity, C pixels of i+2 level intensity, and D pixels of i+3 intensity.

A k vector pixel proportion can be computed for any j×j pixel subregion and used to hash to an array where counts of each proportion are maintained. A count of different pixel intensities in the region can be determined from the pixel proportion (just add the number of non-zero entries in the proportion vector), this defines a distinct kind count, which is another subregion category that can be used in tests for randomness or constantness.

The distinct kind category is perhaps a good compromise for computing randomness, since it simplifies computation by reducing the number of categories to consider. This method is related to the test known in the art as the "Poker Test." Given 4×4 subregion window sampling and a 4 pixel intensity interval, there are 4 possible categories with 4 corresponding probabilities: Four of a kind with probability 4/256; three of a kind with probability 144/256; two of a kind with probability 80/256; and one of a kind with probability 24/256. These concepts are generalized below.

The last subregion category to be considered can be obtained very simply by labeling each cell of a j×j subregion using the pixel intensities in that order as a region characteristic "word". This test is known in the art as the "Permutation Test". For example, if the region under consideration has an intensity range r such that 20<r<25, then the number of possible words or orderings is clearly $4^4$ and the probability of each word occurring randomly in an image should approach $1/4^4$. An example of one word from a 2×2 subregion would be the vector v=(21,22,23,24). Thus in a sample of $n=4^4$, 4×4 pixel subregions, we expect that v would occur once in a "randomly" distributed candidate region. In the general case, a k level intensity range region sampled on j×j subregions, the number of possible words would be $j^{2k}$, and the probability, $1/j^{2k}$.

Pixel proportion analysis of a candidate region can proceed similarly by determining the probability of each proportion by combinatorial methods. Again the number of possible proportions grows quickly as the number of intensities allowed increases. Assuming a 4 intensity spread, the number of proportions can be kept to a reasonable number for hashed lookup purposes. All possible proportions of one to four gray scale intensity within a four pixel sample window (two by two) are pre-computed for use in identifying a random content image region. Each proportion is labeled in a four dimensional intensity array. Combinatorial analysis suggests there are 35 possible proportion categories. For example, there are four possible proportions, each having one intensity, one having all four, six proportions consisting of two pairs of two intensities, and so on. The probability of the one intensity proportions is $1/4^4$. The probability of the proportion having all four intensities is $4!/4^4$ (four factorial over four to power of 4, since there are 4! orders for the four intensities), and so on.

Given these probabilities for each type of category—proportions, words or distinct kinds—we can compute Coefficients of Randomness for sampled subregions for candidate regions. In general, a probability p associated with a pixel category i will be denoted $p_i$ for all i such that $1 \leq i \leq k$, where k is the number of categories.

Random Region Finding

Given an image, a threshold range of four contiguous intensity values and a minimum sub-region size request, this algorithm returns the location and dimensions of a rectangle, whose intensity values, within the range specified are "randomly" distributed. Shades of difference at or below this range are generally not perceived by the human eye. Known region splitting and merging algorithms are employed to locate and return a rectangle containing intensity values satisfying the conditions stated above.

This region is then "gridded" in two by two pixel windows and the windows are processed in row major order or sampled randomly using some suitable random number generator to obtain "random" x and y coordinates for pixel windows within the candidate region. The count of windows in the sample matching each proportion is compiled over all possible intensity categories in the randomness measure being used.

The resulting histogram is normalized with respect to the total number of boxes in the region—that is, the count for each category is divided by the total number of boxes sampled from the region tested. The value for each proportion is now an estimate of that proportion occurring in the candidate region.

Given a sample, compiled over all possible categories, we can test for randomness. The chi-square test is perhaps the best known statistical test of randomness and its Coefficient of Randomness, V, can be computed quickly using the following formula:

$$V = \frac{1}{n} \sum_{1 \le i \le k} \left( \frac{Y_i^2}{p_i} \right) - n,$$

where $p_i$ is the probability of the ith category, n, is the number of windows sampled, $Y_i$ is the count of samples in the ith category, and k is the number of distinct categories available for the computation. Recall that, a category can be a proportion, distinct kind or word, each with an associated probability. The numbers, V and k, can be used to test the randomness of the sample in a standard chi-square table. Note that n, the sample size, should be chosen so that each category's expected counts, $np_i$, are five or more.

Applying the chi-square test to our three category types, k=256 for the Permutation Test; k=4 for the Poker Test and k=35 for the Proportion Test.

A simpler coefficient, V, may used for the Permutation Test since the $p_i$'s are all the same. The sum over all possible words or permutations of the square of these probabilities is defined as a randomness estimate. The V for an image region is given by the following formula:

$$V = \sum_{1 \le i \le k} p_i^2,$$

where $p_i$ is the probability of the ith permutation.

Applying this formula to our application, k=256, so $p_i$=1/256. V will be at a minimum when the sample windows are evenly distributed among all 256 permutations. The sample probabilities for comparison are computed as word or permutation counts divided by the sample size, n. So, if permutation (24,24,24,24) was counted 10 times, its sample probability for the above test would be 10/256.

Thus, V's falling within some close tolerance of this minimum will be judged random enough. This tolerance may be provided by the user or set based on empirical algorithm performance.

The complexity of the random region finding process depends on how many and how fast candidate regions can be found via splitting and merging. Randomness determination is linear in the number of boxes sampled from a candidate region. This portion of the process is fast. The process also terminates on its first success. Any one V can give misleading values in some cases. For example, two pixel wide, alternating intensity stripped patterns could be mistaken for random patterns. Also, repeating vertical or horizontal striped patterns of prime width could present problems. Thus a better strategy might be to combine several weighted V calculations when testing for randomness.

Once a "random" region has been identified, its starting (x, y) coordinate can be saved in any number of ways including those described herein. Such a region is used for input to the Invisible Inking procedures described below.

FIG. 1 illustrates one method in which an image, such as an employee identification picture, is split to identify a random content image region, or a constant content image region as will be discussed below. For a substantially square image, such as the portrait image of FIG. 1, the image is successively subdivided into smaller and smaller quadrant regions. The dark lines in FIG. 1 are provided to represent this region splitting process. Initially the image shown is divided into four quadrants, identified by reference characters 1A through 1D, and thereafter subdivided into smaller and smaller subquadrants identified by reference characters 2A through 2D, 3A through 3D, and 4A through 4D. As the region splitting operation progresses, the subquadrants are examined to identify regions containing random image data as described above, or constant image data as described below.

In FIG. 1, subquadrant 3C is identified as a region containing random image data.

Constant Region Finding

This algorithm differs from the Random Region finding algorithm described above in that the threshold criteria for the region returned is that at least k percent of the region's pixels have one value, or range between a small range of indistinguishable values. The 90 percent criteria could be adjusted to fit the situation. The algorithm could proceed by randomly sampling n windows in a candidate region. If the pixel value falls within the acceptable range it is counted. The final count is divided by n, the sample size, and multiplied by 100 to get a percentage, V. If V<k we reject the region, otherwise we accept. A randomness test is not necessary. Splitting and merging can again be used to find candidate regions. The first region satisfying the criteria is returned.

In FIG. 1, subquadrant 4C is identified as a region containing constant image data.

Constant Region Finding allows automatic identification of connected, unchanging image regions. Such a region can be used for input to the Invisible Inking algorithms described below.

Invisible Inking

Given an identified constant or random region, like those discussed above, and a list of values to be written into the region, the invisible inking process encodes and writes binary data directly into the region or scales data image values into an indistinguishable intensity range and places the scaled values into the image at a known location or pixel coordinate. This location or pixel coordinate is returned along with a set of pixel maps for data image values, the encryption key for binary data, if any, and boundary extent coordinates for the region, itself. The data can be encrypted in any desired way.

Three possible encodings will be given to illustrate the method. A suitable data termination code should be chosen as well, perhaps a code word consisting of entirely of minimum pixel map values.

The simplest way to encode image data in an n-level image for invisible inking would be to recode it as a k-level image (k<n), where each data pixel in a gray-scale data image is contour mapped to pixels in the random or constant region. The pixels could then be recovered directly and used to reconstruct a "similar," k-level image.

Binary data could be encoded directly by defining two coding pixels as 0 and 1 and using them to write fixed length binary words into the image.

More complex schemes could be used to encode binary data. Data values, could be encoded sequentially by multiplying them be successive terms in a known sequence. One such sequence which would allow easy computation would be the binary power sequence (i.e., 1, 2, 4, 8, . . . ). For example, if 5 coding pixels were available, then a modulus 4 operation would be applied to previous result and that result mapped to the minimum region pixel value. The following general formula illustrates this data encoding scheme.

$$e = m + (2^i p) \bmod k, 0 \leq i \leq j,$$

Where m is the minimum coding pixel intensity; p is the data value to be encoded; e is the encoded value to be written into the region; k is the number of region pixels; and j is the maximum power series exponent. After j, the power series exponent would cycle back to 0.

For encoding images, a possible scaling rule might subtract the minimum from each value in the list and divide (floating point division) each new value by the new list's maximum and then multiply by four, taking the floor of the result. The minimum range value for the given random region added to each value determines a new value which can lie "invisible" in the region. Invisible inking relies on human visual insensitivity to fine differences in intensity to store data transparently within image confines. Of course, non-scaled intensities or values can be stored in the region and recovered intact.

FIG. 2 illustrates the process for writing "hidden" text into a region of constant image content within a digital image. In FIG. 2 the phrase "TEXT TO BE STORED" is written into image subquadrant 4C, a region of constant image data. The area in which the text is written, identified by reference characters F3, is shown enlarged in FIG. 3. The text, which differs negligibly in intensity from the text background, is shown in phantom to illustrate that the text is not discernible by the human eye from the text background.

This process could support simple data compression and encryption schemes. Four intensity images might be stored in this way. It could also support an out-of-band data channel for transmitted images (lossless transmission).

It is believed that an invisible inking process can be simply implemented utilizing known image processing techniques.

Invisible Raising

Given a region containing inked data, the location of affected pixels, and a recovery function, this raising process applies the function to inked values and stores them back to the region. Invisible raising automatically highlights information stored on an image through the Invisible Inking process. Of course, if binary coded data has been stored in the region then its recovery would require recovery of its starting coordinate and data bounds, the data encryption key or type, and retrieval and parsing of each encrypted word from the region. These words could then be decrypted using the above key if necessary.

For example, a four level, inked image's values could be lessened by their minimum value, scaled by a constant factor to obtain a high contrast version of the hidden image. A constant could then be added to each value, shifting values as desired before writing them back into the image. The image would then be visible in the region.

FIG. 4 illustrates the process for recovering "hidden" from a known region of constant image content within a digital image. In FIG. 4 the intensity of the text within the phrase "TEXT TO BE STORED", which has been invisibly stored into image subquadrant 4C, is scaled to produce a high contrast between the text and the text background. The area in which the text is written, identified by reference characters F5, is shown enlarged in FIG. 5.

In encryption or restoration operations, the recovery function would be the corresponding inverse function for invisible inking function. The complexity of the inking and recovery processes depends on the complexity of the scaling function and the number of pixels to be operated on.

Possible Applications

These processes described above ease and speed content analysis of digital data stored in databases. They could be an important part of any library of content analysis functions. Such a library may be packaged as part of a multimedia database server product. For example, the described routines could be used to generate index keys for identification or classification of database stored, non-alphanumeric data, i.e., digitized representations of sound, pictures, documents, etc.

These methods discussed herein provide low level, heuristic support for database applications requiring robust means for image storage, identification, categorization, and compression.

Storage can be made more reliable by allowing for detection of image tampering or corruption and recovery of database organization schemes based on image contents alone. For example, image ordering information could be transparently stored within the original image, so that the loss of an external index defining this order could be recreated by a single pass through the images in the database.

Unique identification markers can be quickly imprinted on images such as documents without damage to the information content of the image, and without detection. Without further processing these identification markers are difficult or impossible to detect without knowledge of the methodologies used, or an original of the image. Thus hidden alphabetic and even image data could be encrypted on any image and raised by automatic processes.

Internet web browsing technology is based on imbedded hypertext links which allow location of remote data and multimedia objects in the context of a currently viewed document. The reverse can be done with the methods described here—that is, a hypertext link could be imbedded within an image and the user could simply click the mouse cursor over a site in the image where a hidden object was encoded to activate the link.

Image sorting applications could be built upon the described inking process. Such applications could automatically identify image subsets containing user selected or defined shapes by matching objects within images. For example, automatic extraction of documents based on a corporate logo, proper name, or title appearing within the document could be implemented.

CONCLUSION

It can thus be seen that there has been provided by the present invention a new and useful method for simplifying storage, recognition, classification and retrieval of image data within a multimedia database by hiding data within images saved within the database.

Although the presently preferred embodiment of the invention has been described, it will be understood that various changes may be made within the scope of the appended claims. For example, in the description provided above, all images were assumed to be gray scale images using 0 to 256 positive, integral intensity levels; however, the concepts and methods described below apply just as well to color images. Additionally, in the embodiment described above, text data was "invisibly" written into stored images; however, image or other non-text forms of data could equally as well be written into digital images for storage, recovery, recognition, identification, classification or retrieval of image data.

What is claimed is:

1. A method for including additional data within a stored digital image, said digital image comprising an array of pixels, each pixel having pixel property values such as intensity values, hue values and saturation values associated therewith; the method comprising the steps of:

identifying a constant content image region within said digital image, the pixels within said constant content image region each having a first pixel intensity value;

determining a second pixel intensity value slightly different from said first pixel property value, the difference between said first and second pixel property values being indiscernible by the human eye; and storing said additional data within said constant content image region, said additional data being stored with said second pixel intensity value.

2. The method in accordance with claim 1, wherein:

said first intensity value comprises all intensity values contained within a narrow range of intensity values.

3. A method for including additional data within a stored digital image, said digital image comprising an array of pixels, each pixel having an intensity value associated therewith; the method comprising the steps of:

identifying a random content image region within said digital image, the pixels within said region having intensity values occurring in a testably random pattern;

determining a non-random intensity value, the difference between said non-random intensity value and the intensity values of said pixels contained within said random content image region being indiscernible by the human eye; and storing said additional data within said random content image region, said additional data being encoded at said non-random intensity value.

4. The method in accordance with claim 3, wherein said step of identifying a random content image region comprises the steps of:

dividing said digital image into a plurality of regions;

determining a Coefficient of Randomness for each one of said plurality of regions; and selecting the region having a desired Coefficient of Randomness as said random content image region.

5. The method in accordance with claim 3, wherein:

said additional information comprises text.

6. A method for simplifying storage, recovery, recognition, classification and retrieval of digital images within a multimedia database, said digital images comprising an array of pixels, by incorporating identifying information within said digital image, said identifying information being indiscernible from said digital image upon viewing said digital image bv the human eye, the method comprising the steps of:

identifying a constant content image region within said digital image, the pixels within said constant content image region each having a first intensity value associated therewith;

determining a second intensity value slightly different from said first intensity value, the difference between said first and second intensity values being indiscernible by the human eye; and storing said identifying information within said constant content image region, said identifying information being coded with said second intensity value.

7. A method for simplifying storage, recovery, recognition, classification and retrieval of digital images within a multimedia database, said digital images comprising an array of pixels, by incorporating identifying information within said digital image, said identifying information being indiscernible from said digital image upon viewing said digital image by the human eye, the method comprising the steps of:

identifying a random content image region within said digital image, the pixels within said region each having intensity values associated therewith, said intensity values occurring in a random pattern;

determining a non-random intensity value, the difference between said non-random value and the intensity values of said pixels contained within said random content image region being indiscernible by the human eye; and storing said identifying text within said random content image region, said identifying text being coded with said non-random intensity value.

8. The method in accordance with claim 7, wherein:

said non-random intensity value comprises a coded sequence of intensity values.

9. A method for simplifying storage, recovery, recognition, classification and retrieval of digital images within a multimedia database, said digital images comprising an array of pixels, by incorporating identifying information within said digital image, said identifying information being indiscernible from said digital image upon viewing said digital image by the human eye, the method comprising the steps of:

identifying a constant content image region within said digital image, the pixels within said constant content image region each having a first hue value associated therewith;

determining a second hue value slightly different from said first hue value, the difference between said first and second hue values being indiscernible by the human eye; and storing said identifying information within said constant content image region, said identifying information being coded with said second hue value.

10. A method for simplifying storage, recovery, recognition classification and retrieval of digital images within a multimedia database, said digital images comprising an array of pixels, by incorporating identifying information within said digital image, said identifying information being indiscernible from said digital image upon viewing said digital image bv the human eye, the method comprising the steps of:

identifying a random content image region within said digital image, the pixels within said region each having hue values associated therewith, said hue values occurring in a random pattern;

determining a non-random hue value, the difference between said non-random hue value and the hue values of said pixels contained within said random content image region being indiscernible by the human eye; and storing said identifying text within said random content image region, said identifying text being coded with said non-random hue value.

11. The method in accordance with claim 10, wherein:

said non-random hue value comprises a coded sequence of hue values.

12. A method for simplifying storage, recovery, recognition, classification and retrieval of digital images within a multimedia database, said digital images comprising an array of pixels, by incorporating identifying information within said digital image, said identifying information being indiscernible from said digital image upon viewing said digital image by the human eye, the method comprising the steps of:

identifying a constant content image region within said digital image, the pixels within said constant content image region each having a first saturation value associated therewith;

determining a second saturation value slightly different from said first saturation value, the difference between said first and second saturation values being indiscernible by the human eye; and storing said identifying information within said constant content image region, said identifying information being coded with said second saturation value.

13. A method for simplifying storage, recovery, recognition, classification and retrieval of digital images within a multimedia database, said digital images comprising an array of pixels, by incorporating identifying information within said digital image, said identifying information being indiscernible from said digital image upon viewing said digital image by the human eye, the method comprising the steps of:

identifying a random content image region within said digital image, the pixels within said region each having saturation values associated therewith, said saturation values occurring in a random pattern;

determining a non-random saturation value, the difference between said non-random saturation value and the saturation values of said pixels contained within said random content image region being indiscernible by the human eye; and storing said identifying text within said random content image region, said identifying text being coded with said non-random saturation value.

14. The method in accordance with claim 13, wherein:

said non-random saturation value comprises a coded sequence of saturation values.

15. A method for including additional data within a stored digital image, said digital image comprising an array of pixels, each pixel having pixel property values such as intensity values, hue values and saturation values associated therewith; the method comprising the steps of:

identifying a constant content image region within said digital image, the pixels within said constant content image region each having a first pixel hue value;

determining a second pixel hue value slightly different from said first pixel property value, the difference between said first and second pixel property values being indiscernible by the human eye; and storing said additional data within said constant content image region, said additional data being stored with said second pixel hue value.

16. A method for including additional data within a stored digital image, said digital image comprising an array of pixels, each pixel having pixel property values such as intensity values, hue values and saturation values associated therewith; the method comprising the steps of:

identifying a constant content image region within said digital image, the pixels within said constant content image region each having a first pixel saturation value;

determining a second pixel saturation value slightly different from said first pixel property value, the difference between said first and second pixel property values being indiscernible by the human eye; and storing said additional data within said constant content image region, said additional data being stored with said second pixel saturation value.

* * * * *